United States Patent Office 3,598,594
Patented Aug. 10, 1971

3,598,594
PHOTOGRAPHIC MATERIAL FOR THE SILVER DYE BLEACHING PROCESS
Karl-Heinz Freytag, Leverkusen, Karlheinz Kabitzke, Cologne-Buchheim, Erich Bockly, Leverkusen, and Justus Danhauser, Cologne-Stammheim, Germany, assignors to Agfa-Gevaert Aktiengesellschaft, Leverkusen, Germany
No Drawing. Filed June 18, 1968, Ser. No. 737,815
Claims priority, application Germany, June 27, 1967, A 56,095
Int. Cl. G03c 1/10
U.S. Cl. 96—99          4 Claims

ABSTRACT OF THE DISCLOSURE

Certain sulfonated amino naphthol azo benzene dyes are particularly diffusion-fast, brilliant and light-fast magenta dyes for silver-dye-bleach photographic use. A dye having these properties is an azo silver dye bleach dye of the following formula:

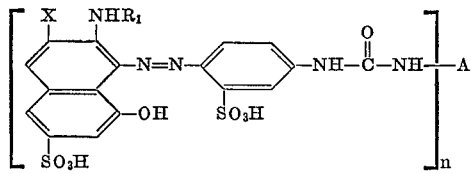

in which
X represents hydrogen or sulfo
$R_1$ stands for hydrogen or a substituted or unsubstituted alkyl group having preferably up to 3 carbon atoms
$n$ is 1 or 2, and Y is
$$-\overset{O}{\underset{\|}{C}}-, \ -SO_2- \ \text{or} \ -\overset{O}{\underset{\|}{C}}-NH-$$

Z is
$$-\overset{O}{\underset{\|}{C}}-, \ -\overset{O}{\underset{\|}{C}}-CH=CH-\overset{O}{\underset{\|}{C}}- \ \text{or} \ -\overset{O}{\underset{\|}{C}}-R_4-\overset{O}{\underset{\|}{C}}-$$

and
$R_2$ and $R_3$ each represents a benzene nucleus which may be substituted by halogen such as chloride bromide, alkyl having preferably up to 3 carbon atoms, alkoxy with preferably up to 3 carbon atoms or halogen substituted alkyl having preferably up to 3 carbon atoms in particular chloro or fluoro substituted alkyl;
$R_4$ represents a substituted or unsubstituted alkyl having preferably up to 5 carbon atoms or $R_2$.

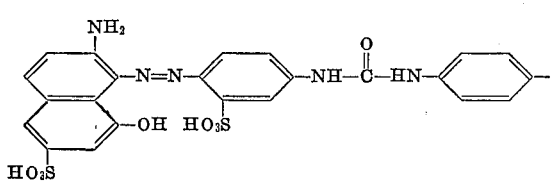

It is known that color photographic images can be produced by the silver-dye-bleach process, wherein a dye, usually an azo dye, is bleached in a homogeneously dyed colloid layer in accordance with a silver image which had been produced photographically.

According to this process, it is possible to produce both negatives and reversal images. If it is desired to produce positive paper prints or duplicate positives from diapositives, the silver image is produced by means of a simple black-and-white development, this silver image representing a negative of the copying original. Since the image dye which is homogeneous-distributed in the layer (or in the 3 layers of a multicolor material) is bleached proportionately to the silver image a dye image is obtained, which is positive with respect to the original. If a silver image is produced which is positive with respect to the original, for example, by a black-and-white reversal development or by the bromide ion diffusion method or silver salt diffusion method, then after the color bleaching a dye image is formed which is opposite in gradation to the original, that is to say a positive color image is formed if the original is a negative color image.

The dyes which are to be used in the silver-dye-bleach process must meet particularly high standards, since these dyes not only have to be spectrally suitable, but also have to be easily bleached and have a substantial fastness to light. In addition, they must not adversely effect the photographic emulsion and must be completely resistant to diffusion in gelatin, which is the material almost exclusively used for formation of the layer. Particularly important are the properties of high fastness to the action of light and resistance to acid gases such as occur e.g. in the air of industrial regions. Other desirable properties are high brilliance i.e. freedom from side absorptions in undesirable regions of the spectrum, as well as enhanced absorption in the desired spectral range.

It has already been proposed that metal complex dyes be used in this process, owing to their increased fastness to light was found, however, that metal complex dyes generally are insufficiently brilliant and they are therefore of limited practical use for the present process.

It is among the objects of the present invention to provide new magenta azo dyes which are particularly suitable for use in the silver-dye-bleach process.

The above object has been attained by providing magenta dyes of the following formula:

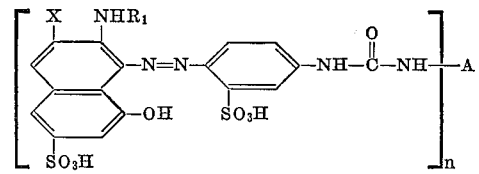

in which
X represents hydrogen or sulfo
$R_1$ stands for hydrogen or a substituted or unsubstituted alkyl group having preferably up to 3 carbon atoms
$n$ is 1 or 2, and Y is
$$-\overset{O}{\underset{\|}{C}}-, \ -SO_2- \ \text{or} \ -\overset{O}{\underset{\|}{C}}-NH-$$

Z is
$$-\overset{O}{\underset{\|}{C}}-, \ -\overset{O}{\underset{\|}{C}}-CH=CH-\overset{O}{\underset{\|}{C}}- \ \text{or} \ -\overset{O}{\underset{\|}{C}}-R_4-\overset{O}{\underset{\|}{C}}-$$

and
$R_2$ and $R_3$ each represents a benzene nucleus which may be substituted by halogen such as chloride bromide, alkyl having preferably up to 3 carbon atoms, alkoxy with preferably up to 3 carbon atoms or halogen substituted alkyl having preferably up to 3 carbon atoms in particular chloro or fluoro substituted alkyl;
$R_4$ represents a substituted or unsubstituted alkyl having preferably up to 5 carbon atoms or $R_2$.

The dyes of the present invention have highly advantageous absorption characteristics and show excellent resistance to diffusion and light fastness.

The following dyes have proved to be particularly suitable for use in photographic layers in the silver dye bleaching process:
(1) 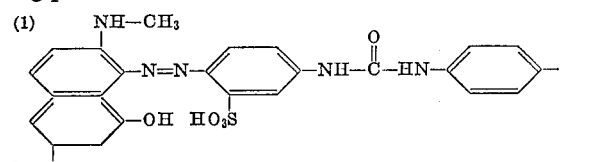
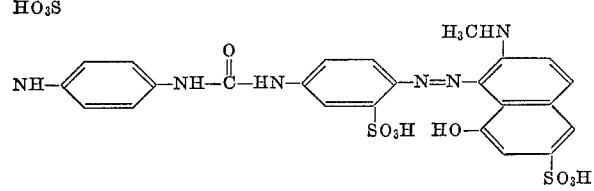
(2) 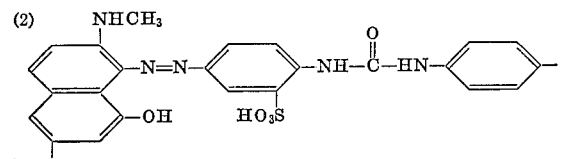
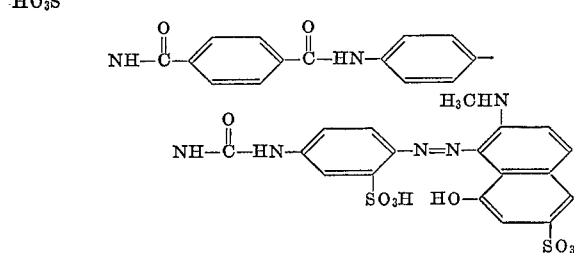
(3) 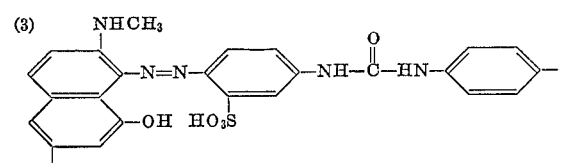
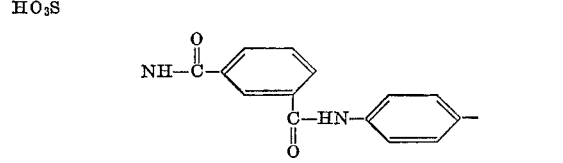
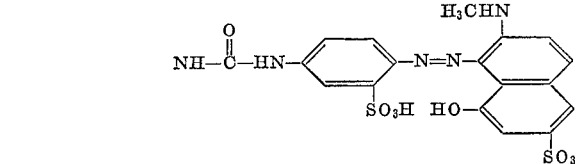
(4) 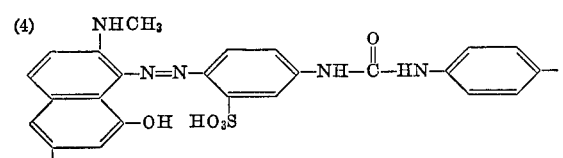
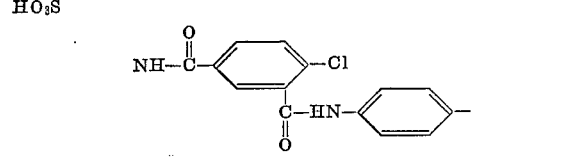
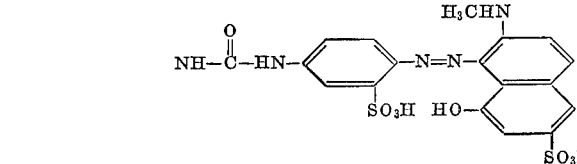
(5) 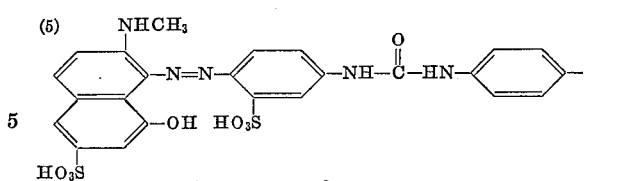
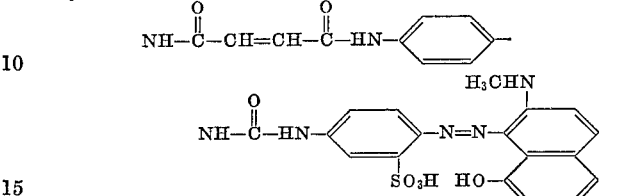
(6) 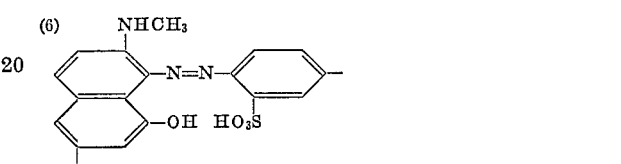
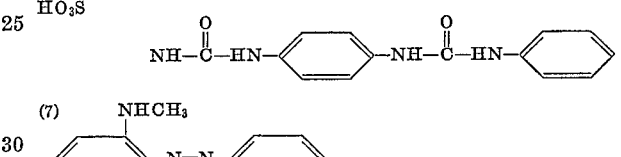
(7) 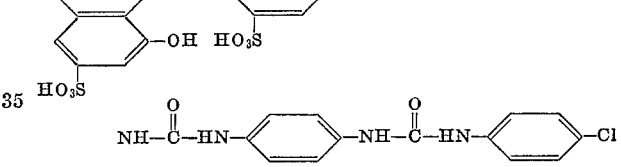
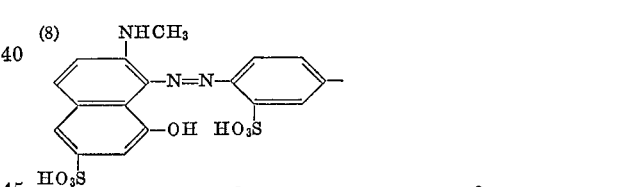
(8) 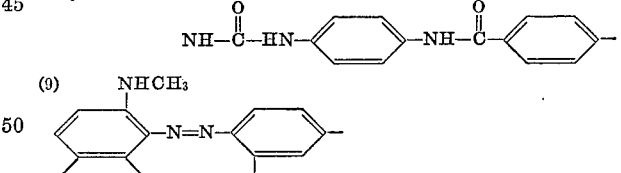
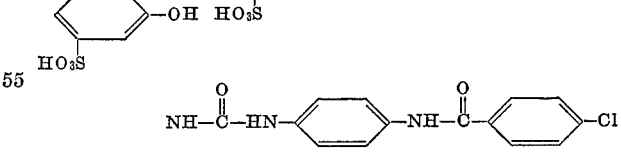
(9) 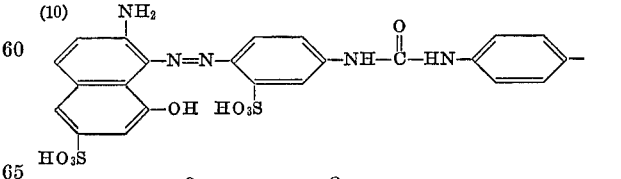
(10) 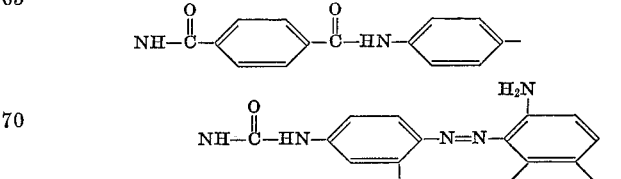

3,598,594
5
(11) 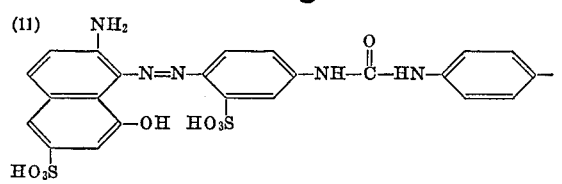
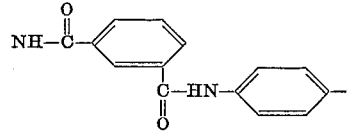
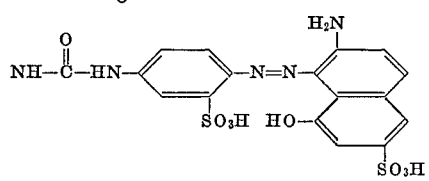
(12) 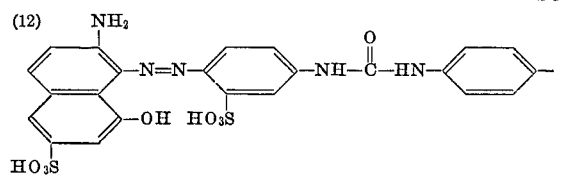
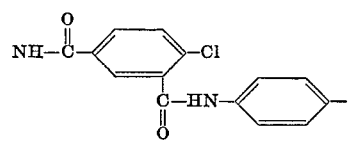
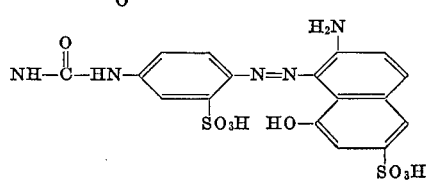
(13) 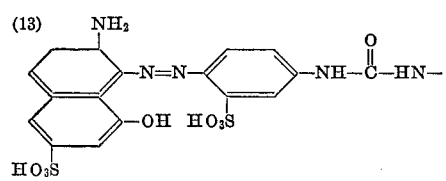
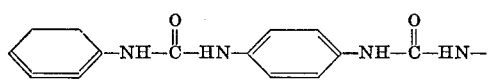
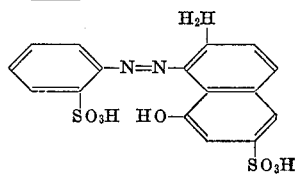
(14) 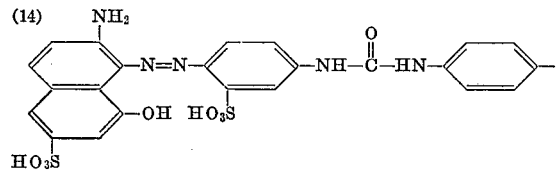
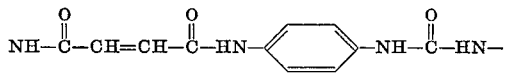
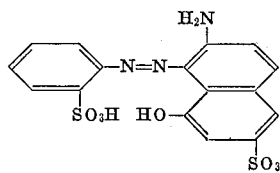
6
(15) 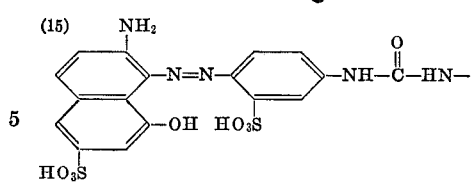
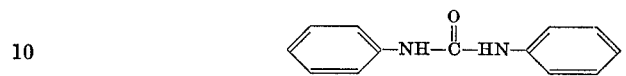
(16) 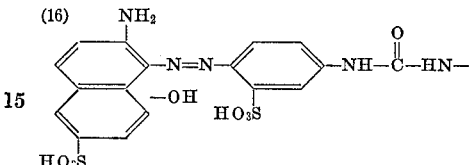
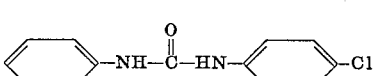
(17) 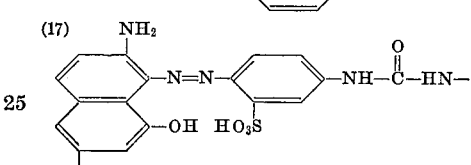
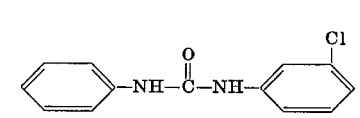
(18) 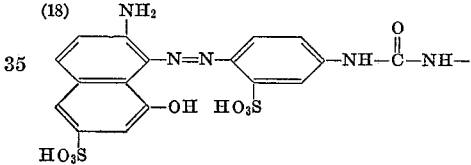
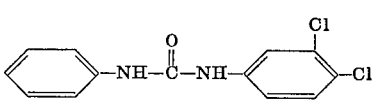
(19) 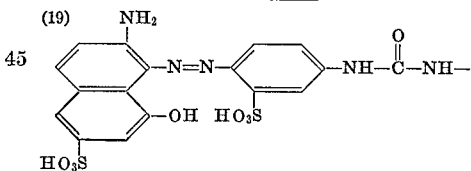
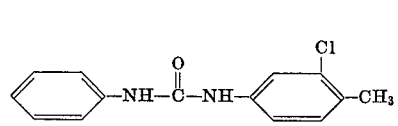
(20) 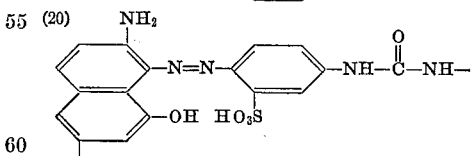
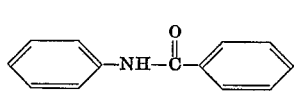
(21) 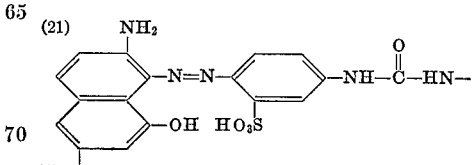
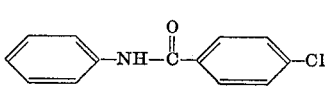

(22) 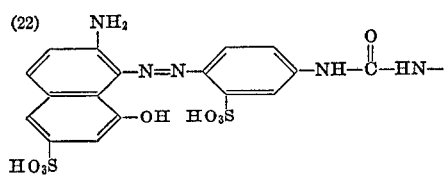
(28) 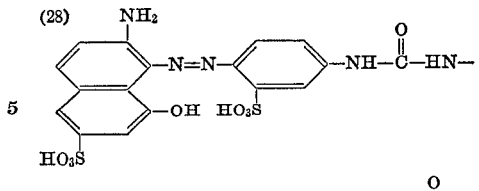
(23) 
(29) 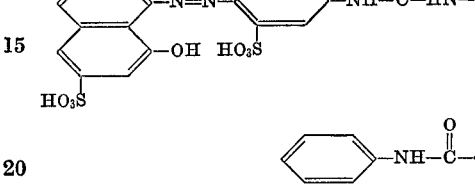
(24) 
(30) 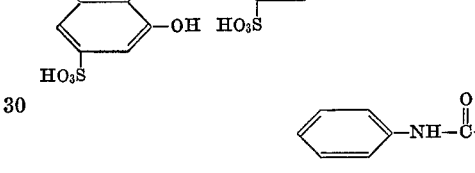
(25) 
(31) 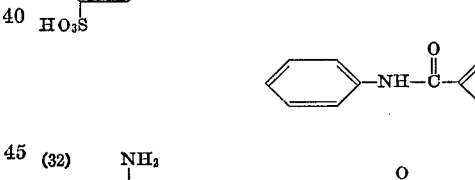
(26) (not shown with crop — continued)
(32) 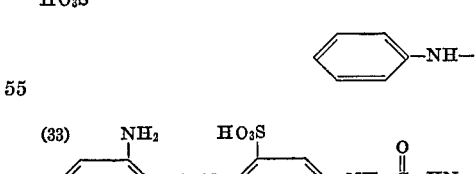
(27) 
(33) 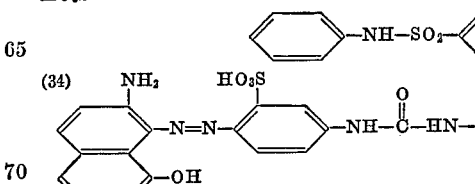
(34) 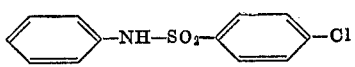

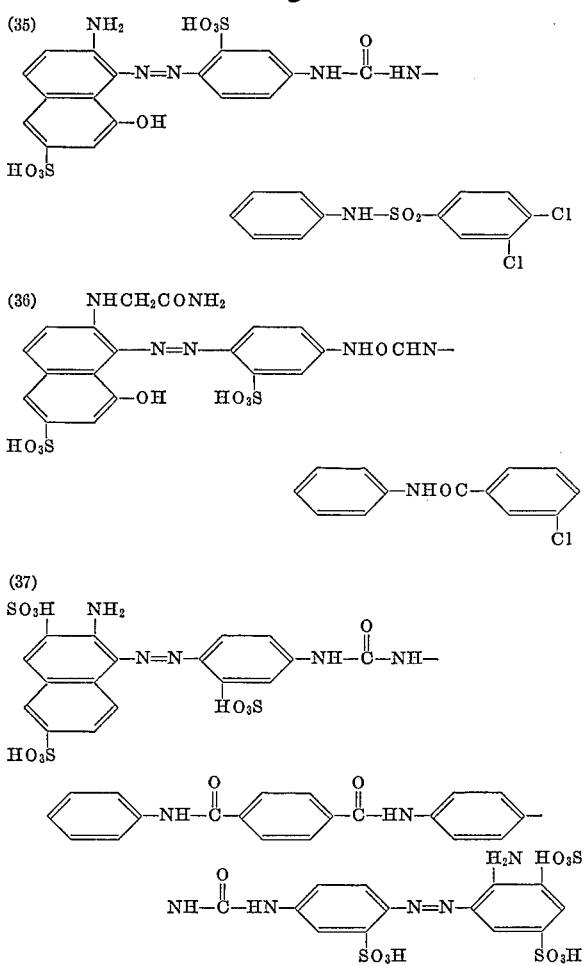

The dyes used according to the invention may be prepared in accordance with common practice by coupling the naphthalene component with suitable diazo compounds.

Dye No. 3

Diazotised 4-nitro-2-sulfoanilin is coupled in acid medium with 2-(N-methylamino)-8-hydroxy-6-sulfonaphthalene and the nitro group is reduced in the usual manner. The resulting aminoazo dye is dissolved in water to form a neutral solution and is reacted with a solution of 4-nitrophenylisocyanate in chlorobenzene. The nitro group so introduced is again reduced in the usual manner and the aminoazo dye is then reacted with isophthalic acid dichloride.

Dye No. 29

Diazotised 4-nitroaniline sulfonic acid-2 is coupled in acid medium with 2-amino-8-hydroxy-6-sulfonaphthalene and the nitro group is reduced in the usual manner. The resulting aminoazo dye is dissolved in water to form a neutral solution and is reacted with a solution of 4-nitrophenylisocyanate in chlorobenzene. After reduction of the nitro group in the usual manner, the aminoazo dye is reacted with 3-chloro-4-methylbenzoyl chloride.

On account of their excellent properties, the dyes according to the invention can be applied in color photographic layers for the silver-dye-bleach process in various ways. As will be seen from the following examples, they are preferably employed as image dyes in layers which are subjected to a simple black-and-white development and consequently form in the subsequent dye bleaching bath a direct positive dye image. However, it is also possible to carry out a black-and-white reversal development, whereby after treatment with common dye-bleaching bath, dye images with a gradation opposite to the original are obtained.

The dyes are substantially inert to agents customarily added to photographic layers, such as stabilizers, sensitizing dyes, chemical sensitizers, plasticizers, wetting agents, hardeners and the like.

As shown in the following example, they can be bleached out to pure whites in different types of bleaching baths, such as those which are based on quinoline and iodide, as described in U.S. Pat. No. 2,629,568 (Example 29) or thiourea (as indicated in British Pat. No. 507,211) and with different bleaching catalysts, such as quinoxalines or phenazine derivatives.

The layers according to the invention can be applied to any supports such as glass, baryta-coated paper, any paper which has been rendered hydrophobic, cellulose acetate or polyester and polycarbonate films, and pigmented cellulose acetate films.

The image whites obtained are not discoloured even after prolonged exposure to light.

The dye wedges and images produced with the dyes according to the invention exhibit particularly good fastness values in the light fastness test.

EXAMPLE 1

850 ml. of a 2% gelatine solution which contains 4.3 g. of dye 4 as well as 0.5 g. of saponin, are added to 500 ml. of silveriodo bromide gelatine emulsion (silveriodide content 5 mol percent) which contains about 12 g. of silver in the form of silver halide per kg. of emulsion. The emulsion is sensitised to green light with the sensitiser of Example 2 of British patent specification 1,078,227. Two samples of the emulsion applied on to a support of baryta-coated paper support and another cellulose triacetate support. About 0.75 g. of silver are applied per square metre. After drying, the samples are exposed in a sensitometer customarily employed in the art behind a grey step wedge to yellow or white light and are processed as follows:

(1) Development for 5 minutes in a solution of 1 g. of p-methylaminophenyl, 13 g. of anhydrous sodium sulfite, 3 g. of hydroquinone, 26 g. of anhydrous soda and 1 g. of potassium bromide in 1000 ml. of water.
(2) Rinsing for 1 minute.
(3) Fixing for 5 minutes in a solution of 200 g. of crystalline sodium thiosulfate, 20 g. of potassium metasulfite in 1000 ml. of water.
(4) Rinsing for 5 minutes.
(5) Hardening for 5 minutes in a solution of 60 ml. of formalin (30%) and 15 g. of sodium bicarbonate in 1000 ml. of water.
(6) Rinsing for 5 minutes.
(7) Dye-bleaching for 15 minutes in a solution of 10 g. of potassium iodide, 10 g. of sodium hypophosphite, 25 ml. of concentrated sulfuric acid, 50 ml. of quinoline, 10 g. of 2,3-dimethylquinoxaline in 1000 ml. of water.
(8) Rinsing for 5 minutes.
(9) Bleaching for 5 minutes in a bath of 25 g. of copper chloride and 5 ml. of concentrated hydrochloric acid in 1000 ml. of water.
(10) Fixing for 10 minutes, as under 2.
(11) Final rinsing for 20 minutes.

After drying, two diffusion-resistant magenta-colored dye images of the test wedge are obtained with satisfactory whites on a transparent and reflecting support, the color of which is not changed even with relatively long exposure to daylight. The light fastness thereof is superior to that of similar prior art dyes.

EXAMPLE 2

The procedure is performed as described in Example 1 except that 4.0 g. of dye 29 are used, instead of dye 4. The emulsion is coated on to a white pigmented cellulose acetate support. After exposure end processing in baths 1 to 6 as in Example 1, processing is continued as follows:

(7) Dye-bleaching for 5 minutes in a solution of 28 g. of thiourea, 18 g. of potassium bromide, 3 mg. of 2-amino-3-hydroxyphenazine and 400 ml. of concentrated hydrochloric acid in 1000 ml. of water.
(8) Rinsing for 5 minutes.
(9) Bleach-fixing for 10 minutes in a solution of 26 g. of tetrasodium-ethylenediamine-tetraacetate, 24 g. of anhydrous soda, 15 g. of ferric chloride, 13 g. of anhydrous sodium sulfite and 200 g. of crystallized thiosulfate in 800 ml. of water.
(10) Final rinsing for 20 minutes.

After drying, a result quite similar to that in Example 1 is obtained, but the color of the test wedge is even more brilliant.

EXAMPLE 3

The procedure is the same as described in Example 1 but instead of dye 4, 4.3 g. of dye 14 are used. After exposure and processing, color images of high brilliance are obtained.

EXAMPLE 4

The process is performed as described in Example 1 but after exposure processing is continued as follows:

(1) Development for 5 minutes in a bath, as indicated in Example 1.
(2) Rinsing for 1 minute.
(3) Bleaching for 1 minute in a solution of 10 g. of potassium dichromate, and 5 g. of concentrated sulfuric acid in 800 ml. of water.
(4) Rinsing for 1 minute.
(5) Clarifying for 1 minute in a bath of 5 g. of anhydrous sodium sulfite in 1000 ml. of water.
(6) Rinsing for 1 minute.
(7) Second uniform exposure for 2½ minutes with a 40 watt lamp at a distance of 20 cm.
(8) Second development as under 1.
(9) Hardening and further processing as in Example 1, using the baths 5-11.

A magenta dye wedge is obtained which has a gradation opposite to that of the original.

EXAMPLE 5

A colour photographic multi-layer material for use in the silver dye bleaching process is prepared as follows:

The following layers are cast successively on to a support of baryta-coated paper:

(1) A red sensitized silver-bromide-silver iodide gelatine emulsion layer (2 mol percent silveriodide) which contains per 500 ml. emulsion 12 mg. of the sensitiser of Example 11 of British patent specification 1,078,227 and 2.7 g. of the following cyan dye

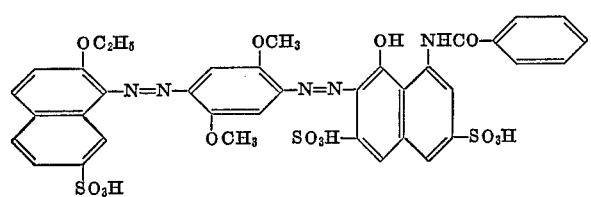

described in British patent specification 1,101,215, dissolved in 250 ml. of a 2% gelatine solution which additionally contains 0.35 g. of saponin and 1.5 ml. of a 30% formalin solution. About 0.75 g. of Ag are applied per m.².
(2) An intermediate layer of a 3% gelatine solution.
(3) A green sensitised layer as described in Example 2.
(4) An intermediate layer of a 3.5% gelatine solution to which 8 g. of tartrazine are added per litre.

(5) An unsensitised blue sensitive silver bromide gelatine emulsion layer which contains per 500 ml. of emulsion 3.1 g. of the following yellow dye

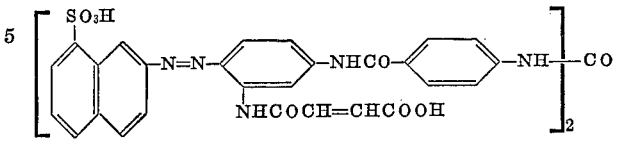

the emulsion contains about 11 g. of silver per kg. in the form of silver halide. The above dye is described in British patent specification 1,093,923. The amount of silver applied is about 0.6 g./m.².
(6) A protective layer of a 2% gelatine solution.

After drying, the film is exposed behind a multicoloured transparency and processed as described in Example 1, except that 50 to 100 mg. of 2,3-dimethylquinoxaline are added to the dye bleaching bath and the treatment time is increased to 25 minutes. A light fast reproduction of the original is obtained in brilliant colours.

We claim:
1. Light sensitive colour photographic material with at least one silver-dye-bleach silver halide emulsion layer, in which the silver-dye-bleach dye is an azo dye of the following formula:

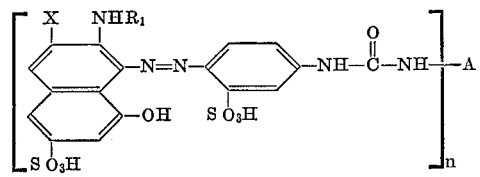

in which

X represents hydrogen or sulfo;
$R_1$ stands for hydrogen or an alkyl group having up to 3 carbon atoms;
$n$ is 1 or 2,
A represents $-R_2-HN-Y-R_3$ when $n$ is 1 or $-R_2-HN-Z-NH-R_2-$ when $n$ is 2, in which
Y is

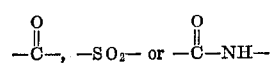

Z is

and
$R_2$, $R_3$ and $R_4$ each represents a benzene nucleus.

2. Light-sensitive photographic material as defined in claim 1, wherein the silver-dye-bleach dye has the following formula:

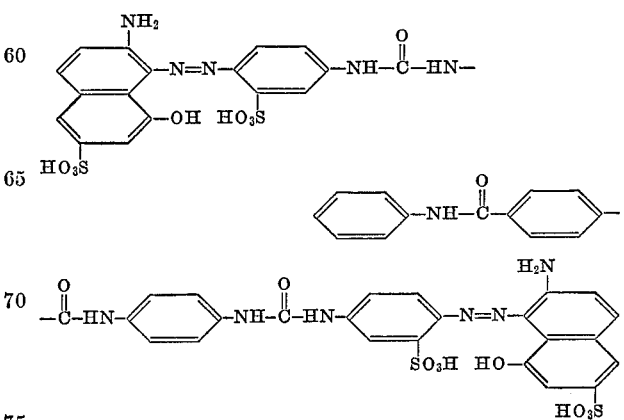

3. Light-sensitive photographic material as defined in claim 1, wherein the silver-dye-bleach dye has the following formula:
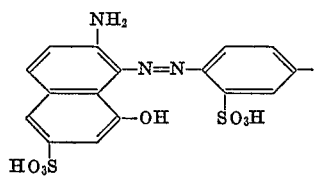
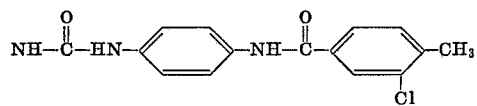
4. Light-sensitive photographic material as defined in claim 1, wherein the silver-dye-bleach dye has the following formula:
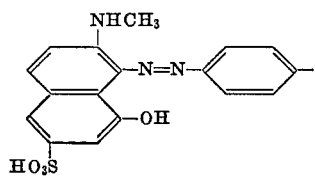
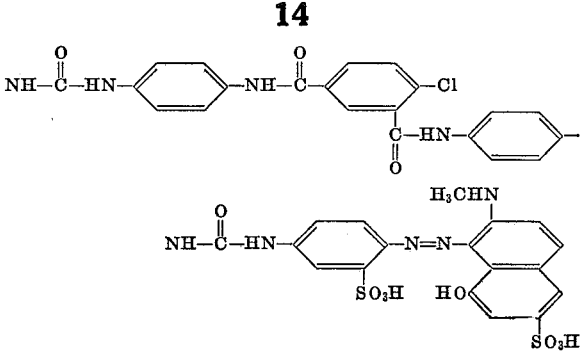
References Cited
UNITED STATES PATENTS
3,211,554  10/1965  Dreyfuss _____ 96—99
3,454,402  7/1969   Anderan et al. _____ 96—99
J. TRAVIS BROWN, Primary Examiner
U.S. Cl. X.R.
96—20, 53; 260—175